United States Patent [19]

Laferty et al.

[11] 4,199,551
[45] Apr. 22, 1980

[54] RECOVERY OF MOLYBDENUM AND URANIUM FROM ACTIVATED CHARCOAL CONTAINING MOLYBDENUM AND RESIDUAL URANIUM

[75] Inventors: John M. Laferty, Wheatridge; James L. Johnson, Lakewood; Blair T. Burwell, Golden, all of Colo.

[73] Assignee: Amax Inc., Amax Center, Greenwich, Conn.

[21] Appl. No.: 869,338

[22] Filed: Jan. 13, 1978

[51] Int. Cl.$^2$ .................. C01G 43/00; C01G 39/00
[52] U.S. Cl. ................................. 423/6; 423/15; 423/18; 423/54; 423/55
[58] Field of Search .............. 423/2, 6, 18, 15, 54, 423/55

[56] References Cited

U.S. PATENT DOCUMENTS

| | | | |
|---|---|---|---|
| 2,819,944 | 1/1958 | Wibbles et al. | 428/292 |
| 2,901,314 | 8/1959 | Vavalides | 423/8 |
| 3,288,570 | 11/1966 | Henrickson | 423/6 |
| 3,790,658 | 2/1974 | Fox et al. | 423/15 |
| 3,799,883 | 3/1974 | Arino et al. | 423/2 |
| 3,940,318 | 2/1976 | Arino et al. | 423/2 |
| 4,092,399 | 5/1978 | Narayan et al. | 423/2 |

Primary Examiner—Edward A. Miller
Attorney, Agent, or Firm—Michael A. Ciomek; Eugene J. Kalil

[57] ABSTRACT

Molybdenum is separated from molybdenum-containing activated charcoal or char also containing small amounts of uranium obtained as a by-product in uranium leaching processes by stripping with an alkaline solution to provide a molybdenum-containing solution containing substantially less than 500 ppm $U_3O_8$.

14 Claims, No Drawings

RECOVERY OF MOLYBDENUM AND URANIUM FROM ACTIVATED CHARCOAL CONTAINING MOLYBDENUM AND RESIDUAL URANIUM

This invention relates to the selective recovery of molybdenum as a high grade by-product from activated charcoal containing small amounts of uranium obtained in uranium leaching operations.

Field of the Invention

It is known to recover uranium from uranium oxide ore (e.g., pitchblende) by leaching with either an acid or alkaline solution. In some uranium ore districts, molybdenum occurs in sufficient concentrations such that the molybdenum specification is exceeded in the uranium product. Some producers have installed, where necessary, processes to remove molybdenum from uranium-bearing streams. In most instances, however, attempts to recover a saleable molybdenum product have not been successful because of uranium contamination of the product.

The following processes are generally employed in the extraction of uranium from ores:

(1) Sulfuric acid leaching in the presence of $NaClO_4$ or $MnO_2$ as oxidants.

(2) Sodium carbonate—sodium bicarbonate leaching in the presence of oxidants.

(3) Ammonium carbonate—ammonium bicarbonate leaching in the presence of an oxidant.

Processes (1) and (2) are agitated leaching systems which are carried out after the ore has been mined, crushed and ground; whereas, process (3) is practiced on ore in situ by pumping the leach solution or lixiviant into underground uranium-bearing strata and then removing pregnant solutions from recovery wells for further treatment.

Different ore bodies found in the United State contain uranium minerals, such as uraninite (disseminated pitchblende), carnotite, coffinite, thucholite, torbernite, uranophane, among many others, with the first three minerals predominating. Molybdenum occurs in troublesome quantities in certain minerals, particularly in uraninite.

Not all leaching solutions employed in uranium recovery result in molybdenum contamination. For example, sodium carbonate-sodium bicarbonate leaching followed by direct precipitation of a uranium product does not result in molybdenum contamination. Generally speaking, it is the acid leach or ammonium carbonate-ammonium bicarbonate systems which present the problem of molybdenum contamination.

For example, where the ammonium carbonate-bicarbonate solution is used to leach the ore, the pregnant solution is passed through an ion exchange resin where the metal values uranium and a portion of the molybdenum are extracted. The metal values are stripped from the ion exchange resin using a solution of sodium chloride, sodium carbonate and ammonia, and the resulting solution containing, for example, about 1.5 gpl Mo and 7 to 8 gpl $U_3O_8$ is acidified with $H_2SO_4$ to a pH of about 2 and then passed through a bed of activated charcoal to selectively remove the molybdenum. This provides a purified solution of uranium containing 7 to 8 gpl of $U_3O_8$ and up to about 40 ppm Mo.

The activated charcoal or char which contains substantial amounts of molybdenum and some uranium is usually regenerated by passing a sodium hydroxide solution through it which removes substantially all of the molybdenum. However, the sodium hydroxide apparently contains sufficient $NaCO_3$ such that considerable uranium in the char is also solubilized. Generally, the molybdenum strip solution which contains uranium (as an impurity) calculated as $U_3O_8$ substantially in excess of 500 ppm, e.g. over 1000 ppm, such as 2000 to 5000 ppm $U_3O_8$, is sent to waste.

Thus, over a period of time, substantial amounts of molybdenum are irretrievably lost because of the relatively high amounts of uranium impurity present.

It would be desirable to provide a process for recovering molybdenum from activated charcoal as a solution substantially impoverished in uranium, for example, containing substantially less than 500 ppm $U_3O_8$, generally less than about 200 ppm $U_3O_8$, and preferably less than about 100 ppm.

OBJECTS OF THE INVENTION

It is an object of the invention to provide a stripping process for selectively recovering molybdenum from activated charcoal containing uranium as an impurity and to produce a molybdenum-containing solution substantially impoverished in said uranium.

Other objects will more clearly appear when taken in conjunction with the following disclosure and the appended claims.

STATEMENT OF THE INVENTION

According to one embodiment of the invention, molybdenum is selectively recovered from activated charcoal or char by contacting said charcoal with an aqueous alkaline solution substantially free of carbonate at a pH value in excess of about 6, the concentration of said alkaline solution being such as to provide a pregnant solution containing at least about 15 gpl molybdenum and substantially less than 500 ppm $U_3O_8$, such as below about 200 or 100 ppm $U_3O_8$. The alkaline solution may comprise an ammonia solution or a solution of an alkali metal hydroxide, such as sodium hydroxide. An ammonia solution is one obtained by bubbling ammonia through water or it may be ammonium hydroxide. The term "substantially free of carbonate" is understood to include the presence of small amounts of carbonate that do not adversely affect the selectivity of the process.

According to another embodiment of the invention, molybdenum is selectively recovered from a bed of activated charcoal or char by first stripping uranium from the charcoal with an aqueous acid solution (e.g. a mineral acid, such as $H_2SO_4$) at a pH value less than 5.5, for example 2 to 5, such as about 3 or 3.5, and thereafter stripping the molybdenum contained in said char with an alkaline solution to provide a pregnant solution containing at least about 15 gpl molybdenum and substantially less than 500 ppm $U_3O_8$, such as below about 200 or 100 ppm $U_3O_8$.

It is not uncommon for the molybdenum containing char to have occluded solution in the pores thereof having an acid pH value of say in the range of about 1 to 4. Thus, by merely passing an ammonia solution through the char, the initial solution passing through the bed of char will still have the desired acid pH to effect the selective removal of the uranium contaminant during the initial stripping phase until the pH value rises to over about 6 or 7, following which the molybdenum is removed by the follow-up alkaline solution (e.g., ammonia solution). The aqueous solution discharged during the initial phase of the stripping is set aside, this portion of the solution containing a preponderant part of the uranium. This solution may be recycled to the uranium recovery circuit. The remaining alkaline solution passing through the bed of char which contains the stripped molybdenum and small amounts of $U_3O_8$ is collected.

On the other hand, the stripping process may comprise first directly acid stripping of the uranium followed by the stripping of molybdenum with an aqueous alkaline solution. Stripping with either an ammonia or sodium hydroxide solution produces a product substantially free of uranium. An ammonia solution is preferred in that $NH_4MoO_4$ has a higher value as a product and has wider market appeal.

Thus, the expression "stripping uranium from the char with an aqueous solution at a pH value less than about 5.5" is meant to cover the situation where an occluded acid solution is contained in the bed of char which is removed by a follow-up flow of an aqueous alkaline solution and the uranium thereby selectively removed in the initial stripping phase, or the situation where an acid solution (i.e., $H_2SO_4$ or HCl) is first expressly passed through the bed of char to remove selectively the uranium followed by a flow of an alkaline solution to remove the uranium-impoverished molybdenum.

The activated charcoal typically has a molybdenum loading of at least about 2 to 2.5 lbs of contained Mo/cu.ft. of char or even lower amounts obtained by extraction from a pregnant uranium leach solution, the char also containing between about 2000 to 5000 ppm of $U_3O_8$. (All compositions are by weight unless otherwise stated.)

The char is first stripped of uranium with dilute mineral acid at a pH value of approximately 3, following which the molybdenum is stripped using, for example, a 2.8% concentration of ammonia solution. The stripping with the 2.8% ammonia solution generally provides a molybdenum solution containing about 50 to 60 gpl Mo. Higher ammonia concentrations in excess of 2.8% will give higher molybdenum concentration in the strip solution. A 5.6% ammonia solution, for example, will provide a molybdenum solution containing anywhere from about 80 to 100 gpl Mo.

However, molybdenum solutions containing over about 140 gpl Mo are not too desirable as ammonium molybdate tends to crystallize out and plug the column of activated charcoal. The strip solution should contain at least about 15 gpl Mo and range upwards of about 140 gpl Mo, a range of about 40 to 125 gpl Mo being preferred.

On the other hand, molybdenum concentrations in the range of 100 to 120 gpl may be desirable for producing an ammonium molybdate product therefrom by crystallization. Following the stripping of molybdenum, the char column is washed with water and the regenerate charcoal may be returned to the uranium leaching circuit.

The invention has the additional advantage in that small amounts of adsorbed zirconium are also removed, the presence of which poisons the char and adversely affects its usefulness for removing molybdenum from the uranium leach solution.

Tests were conducted on activated charcoal containing by weight on the dry basis about 17% to 18% Mo and 2500 to 3000 ppm $U_3O_8$. The tests which were conducted on char with occluded acid solution showed that a high concentration of molybdenum in an alkaline solution, such as an ammonia solution, can be stripped from the loaded char. Very low uranium levels are obtainable in the final molybdenum solution. It may be desirable to recycle ammonia solution through the char column to obtain a solution containing as high as 125 gpl Mo and higher. However, in most instances, a once-through flow of the ammonia solution will suffice by controlling the flow rate through the bed of charcoal and the ammonia concentration to achieve the desired molybdenum concentration.

As stated hereinabove, the uranium is first removed from the char at a pH value below about 5.5, e.g., about 3. As the pH value rises to above 6, molybdenum starts to strip. About 95% of the molybdenum was selectively stripped from the char column using the aforementioned ammonia solution (2.8% $NH_3$), the final strip solution containing 55 gpl Mo with a uranium concentration corresponding to less than 10 ppm $U_3O_8$.

As illustrative of one embodiment of the invention, the following examples are given.

EXAMPLE 1

A sample of char was obtained which assayed on the dry basis as follows: 17.8% Mo and 2830 ppm $U_3O_8$. A 60 cc volume of char plus entrained acid liquid was loaded in a glass column and the molybdenum stripped with 2.8% aqueous ammonia solution by down flow through the column at the rate of one bed volume per hour, the ammonia solution being preceded by displacing the occluded acid solution which resulted in the removal of substantial amounts of $U_3O_8$ at a pH in the neighborhood of about 3. This will be clearly apparent by referring to the following table.

Table 1

SUMMARY OF STRIPPING TESTS WITH DILUTE AQUEOUS AMMONIA

| ml Passed | Time Min. | pH | gpl Mo | ppm $U_3O_8$ | Cum % Mo Stripped |
|---|---|---|---|---|---|
| 25 | 25 | 3.0 | 0.271 | 3528 | 0.08 |
| 15 | 40 | 2.9 | 0.281 | 3461 | 0.1 |
| ↓ | 55 | 6.6 | 29.4 | 16.6 | 5.2 |
| ↓ | 70 | 7.1 | 49.5 | 5.7 | 13.7 |
| ↓ | 85 | 7.0 | 50.9 | 7.4 | 22.5 |
| ↓ | 100 | 7.2 | 62.7 | 9.1 | 33.2 |
| ↓ | 115 | 7.2 | 69.6 | 10.0 | 45.2 |
| ↓ | 130 | 7.3 | 71.7 | 10.0 | 57.5 |
| ↓ | 145 | 7.3 | 71.4 | 11.5 | 69.8 |
| ↓ | 160 | 7.5 | 67.4 | 6.7 | 81.4 |
| ↓ | 175 | 8.5 | 55.6 | 0.15 | 91.0 |
| ↓ | 190 | 10.5 | 19.9 | 0.17 | 94.4 |
| ↓ | 205 | 10.8 | 6.52 | 0.13 | 95.5 |
| ↓ | 220 | 11.0 | 3.54 | 0.19 | 96.1 |
| ↓ | 235 | 11.2 | 2.44 | 0.20 | 96.5 |
| ↓ | 250 | 11.2 | 1.81 | 0.21 | 96.9 |
| ↓ | 265 | 11.3 | 1.47 | 0.32 | 97.1 |
| Cumulative grams Mo removed | | | | 8.4702 | |
| Residual Mo remaining grams | | | | 0.252 | |
| Total Mo | | | | 8.722 | |

As will be noted, the effluent strip solution leaving the char column at a pH value of 3 and 2.9, respectively, contains substantial amounts of $U_3O_8$ (3528 and 3461 ppm, respectively), the amount of molybdenum entering the solution being inhibited to very low amounts (i.e., 0.271 and 0.281 gpl, respectively).

However, as the pH value of the strip solution reached a level of over about 6, that is, 6.6 and above, the effluent strip solution showed a marked increase in molybdenum removal, the amount of $U_3O_8$ in solution falling to 16.6 ppm and lower.

EXAMPLE 2

A test was conducted on the molybdenum-containing char using concentrated ammonia (28%). A 60 ml volume of 28% ammonia solution was recycled through a 60 ml bed volume of char containing occluded acid solution. The solution obtained contained a maximum of 124.4 gpl Mo after a throughput of one hour of the stripping solution.

EXAMPLE 3

A test was conducted in which a molybdenum loaded char was employed which assayed after draining and washing with water substantially as follows:

17.4% Mo
2400 ppm $U_3O_8$

A 200 ml volume of wet char was charged to a glass column and one equal bed volume of deionized water acidified with $H_2SO_4$ to a pH value of about 2 was passed through the bed. Then one bed volume of deionized water was passed through the bed.

A volume of 300 ml of 5.6% $NH_3$ solution was passed at 200 ml/hr (one bed volume per hour) through the char at six stages of 50 ml each (total 300 ml).

The pH value during the acid treatment ranged from 1.76 to 2.88 at the end of the washing treatment.

Following washing, the first ammonia strip (50 ml) resulted in an end pH value of 3.1. A preponderant part of $U_3O_8$ was selectively removed from the char at a pH value ranging from 1.76 to 3.1.

The results obtained from the second to the sixth ammonia strip of 50 ml each were as follows.

TABLE 2
SUMMARY OF STRIPPING TESTS FOR EXAMPLE 3

| Strip | Vol., ml | Mo, gpl | pH |
|---|---|---|---|
| Second | 50 | 27.9 | 6.06 |
| Third | 50 | 60.5 | 6.55 |
| Fourth | 50 | 79.1 | 6.69 |
| Fifth | 50 | 90.6 | 6.85 |
| Sixth | 50 | 99.8 | 6.99 |
| First Water Wash | 100.0 | 55.4 | 9.81 |
| Second Water Wash | 100.0 | 4.8 | 10.55 |

The $U_3O_8$ content of the combined solutions was less than 10 ppm. As will be noted from Table 2, the molybdenum level of the solutions ranged from 27.9 to 99.8 and averaged 65.4 gpl for the combined strip solutions including the first water wash.

The concentration of the alkaline strip solution may vary over a relatively broad range. For example, the concentration of the ammonia solution may range from about 1% to 28% by weight $NH_3$ and preferably from about 2% to 10% by weight. The concentration of the final molybdenum solution obtained varied directly with the concentration of the alkaline solution employed, the concentration of the alkaline solution being at least about 0.25 molar.

In working over an ammonia concentration of 2% to 10%, the molybdenum content of the stripping solution will generally contain over 15 gpl Mo and range upwards of 140 gpl Mo, e.g. 40 to 125 gpl Mo.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for recovering molybdenum as a solution from activated charcoal containing substantial amounts of molybdenum and residual amounts of uranium corresponding to over 500 ppm $U_3O_8$ which comprises;

selectively stripping said uranium with an aqueous solution of pH value less than about 5.5 to remove selectively said $U_3O_8$, and then stripping said charcoal of said molybdenum with an alkaline solution, the concentration of said alkaline solution being such as to provide a pregnant solution containing at least about 15 gpl molybdenum and substantially less than 500 ppm $U_3O_8$.

2. The process of claim 1, wherein the concentration of the alkaline solution is at least about 0.25 molar.

3. The process of claim 1, wherein the uranium is stripped at a solution pH of about 2 to 5.

4. The process of claim 1, wherein the alkaline solution is an ammonia solution of concentration ranging from about 1 to 28% by weight.

5. The process of claim 4, wherein the ammonia concentration ranges from about 2% to 10% by weight.

6. The process of claim 4, wherein the molybdenum concentration of the solution following stripping ranges from about 15 to 140 gpl.

7. The process of claim 1, wherein said uranium is selectively stripped from said bed of charcoal by first passing an acid solution of said pH through said bed.

8. A process for recovering molybdenum as a solution from a bed of activated charcoal containing substantial amounts of molybdenum and residual amounts of uranium corresponding to over 500 ppm $U_3O_8$ which comprises;

selectively stripping said uranium with an aqueous solution of pH value less than about 5.5 to remove selectively said $U_3O_8$, and then stripping said bed of said molybdenum with an ammonia solution of predetermined concentration sufficient to recover molybdenum therefrom and provide a pregnant solution containing molybdenum substantially in excess of about 15 gpl and containing substantially less than 500 ppm $U_3O_8$.

9. The process of claim 8, wherein said uranium is stripped by passing an acid solution of said pH value through said bed of activated charcoal.

10. The process of claim 8, wherein said uranium is stripped at a solution pH value of about 2 to 5.

11. The process of claim 8, wherein the ammonia concentration ranges from about 1 to 28% by weight.

12. The process of claim 11, wherein the ammonia concentration ranges from about 2% to 10% by weight.

13. The process of claim 12, wherein the molybdenum concentration of the solution following stripping ranges from about 15 to 140 gpl.

14. The process of claim 2, wherein the alkaline solution is sodium hydroxide.

* * * * *